US008948349B2

(12) United States Patent
Ezumi

(10) Patent No.: US 8,948,349 B2
(45) Date of Patent: Feb. 3, 2015

(54) COMMUNICATION APPARATUS AND CONTROL METHOD THEREOF

(75) Inventor: Yosuke Ezumi, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 1544 days.

(21) Appl. No.: 12/115,707

(22) Filed: May 6, 2008

(65) Prior Publication Data

US 2008/0279346 A1 Nov. 13, 2008

(30) Foreign Application Priority Data

May 7, 2007 (JP) ................. 2007-122798

(51) Int. Cl.
| H04M 1/64 | (2006.01) |
| H04M 1/65 | (2006.01) |
| H04M 1/725 | (2006.01) |
| H04M 3/00 | (2006.01) |
| H04M 1/658 | (2006.01) |

(52) U.S. Cl.
CPC ........ *H04M 1/6505* (2013.01); *H04M 1/72502* (2013.01); *H04M 1/658* (2013.01)
USPC ............................................ 379/68; 379/312

(58) Field of Classification Search
CPC .................................................. H04M 1/6505
USPC ............ 379/67.1, 68; 455/432, 412, 426, 553
See application file for complete search history.

(56) References Cited

U.S. PATENT DOCUMENTS

| 4,831,646 A | * | 5/1989 | Hashimoto ...................... 379/82 |
| 5,793,844 A | * | 8/1998 | Matsuda ........................ 379/79 |
| 6,148,213 A | * | 11/2000 | Bertocci et al. ............... 455/462 |
| 2003/0095640 A1 | * | 5/2003 | Hatamura .................... 379/67.1 |
| 2004/0132445 A1 | * | 7/2004 | Rogalski et al. ............ 455/426.1 |
| 2005/0278767 A1 | * | 12/2005 | Ahluwalia .................... 725/109 |

FOREIGN PATENT DOCUMENTS

| JP | 01-238353 A | 9/1989 |
| JP | 04-262655 A | 9/1992 |
| JP | 11-068931 A | 3/1999 |
| JP | 2003-229950 A | 8/2003 |
| JP | 2006-279367 A | 10/2006 |

* cited by examiner

*Primary Examiner* — Fan Tsang
*Assistant Examiner* — Solomon Bezuayehu
(74) *Attorney, Agent, or Firm* — Canon USA, Inc. IP Division

(57) ABSTRACT

In a communication apparatus including a base unit provided with an answering machine function and a cordless handset wirelessly connected to the base unit, a wireless unit that communications with a setting unit that sets the answering machine function and the cordless handset requests the setting unit to set the answering machine function, if the wireless unit receives a command to set the answering machine function from the cordless handset while a communication control unit that detects an incoming call on an outside line is detecting an incoming call on an outside line.

6 Claims, 15 Drawing Sheets

COMMUNICATION APPARATUS AND CONTROL METHOD THEREOF

BACKGROUND OF THE INVENTION

1. Field of the Invention

The present invention relates to a communication apparatus having an answering machine function and a control method thereof.

2. Description of the Related Art

Heretofore, cordless telephones equipped with an answering machine function automatically answer a call and record a message from the caller after detecting a predetermined number of rings (ringing signals) when the answering machine function is set. Further, it is possible to listen to the message on the base unit as it is being recorded.

That is, while the base unit is used to record the caller's message to an internal memory or the like when in answering machine mode, the message being recorded can also be output as audio from an internal speaker.

Conventionally, answering machine function settings have been performed in a standby state. Therefore, it is not possible to transfer to answering machine mode after receiving a call in normal mode, or to transfer to normal mode (standby state) and answer the call after receiving a call in answering machine mode, which is inconvenient. In view of this, Japanese Patent Laid-Open No. 11-068931 proposes a mobile telephone that improves user friendliness by enabling the operation mode to be switched anytime, not just when in a standby state.

The above prior art discloses that the operation mode of the mobile telephone itself transfers to answering machine mode after receiving a call. On the other hand, with many cordless answering machines, a cordless handset connected to the base unit cannot be used to set or cancel the answering machine function during an incoming call, similarly to the base unit, since the answering machine function is set in the base unit.

SUMMARY OF THE INVENTION

The present invention has been made in order to solve the foregoing problems. According to one embodiment, the present invention enables an answering machine function to be set from a cordless handset during an incoming call.

According to one aspect of the invention, there is provided a communication apparatus including a base unit provided with an answering machine function and a handset wirelessly connected to the base unit, comprising a setting unit configured to set the answering machine function; a communication control unit configured to detect an incoming call on an outside line; and a wireless unit configured to communicate with the setting unit and the handset, wherein if the wireless unit receives a command to set the answering machine function from the handset while the communication control unit is detecting an incoming call on an outside line, the wireless unit requests the setting unit to set the answering machine function.

According to another aspect of the invention, there is provided a method of controlling a communication apparatus including a base unit provided with an answering machine function and a handset connected via a wireless unit provided in the base unit, comprising: detecting an incoming call on an outside line; determining, when an incoming call on an outside line is being detected, whether the wireless unit has received a command from the handset; and determining whether the command is to set the answering machine function of the base unit, wherein the answering machine function of the base unit is set if it is determined that the command is to set the answering machine function.

According to the present invention, the answering machine function of a base unit can be set from a handset even during an incoming call on an outside line. The load on the CPU can also be reduced by sending a setting request to the setting unit after the wireless unit has performed communication processing in relation to a request from the handset to set the answering machine function.

Additional features and aspects of the present invention will become apparent from the following drawings and detailed description.

DESCRIPTION OF THE EMBODIMENTS

Embodiments for implementing the invention will now be described in detail with reference to the drawings.

In the present embodiment, a facsimile (fax) machine with cordless answering machine will be described as an example of a communication apparatus having an answering machine function. Note that the present invention is not limited to this configuration, and may be applied to a multifunction peripheral having a printer function, a scanner function, a facsimile function and an answering machine function.

Figure 1:
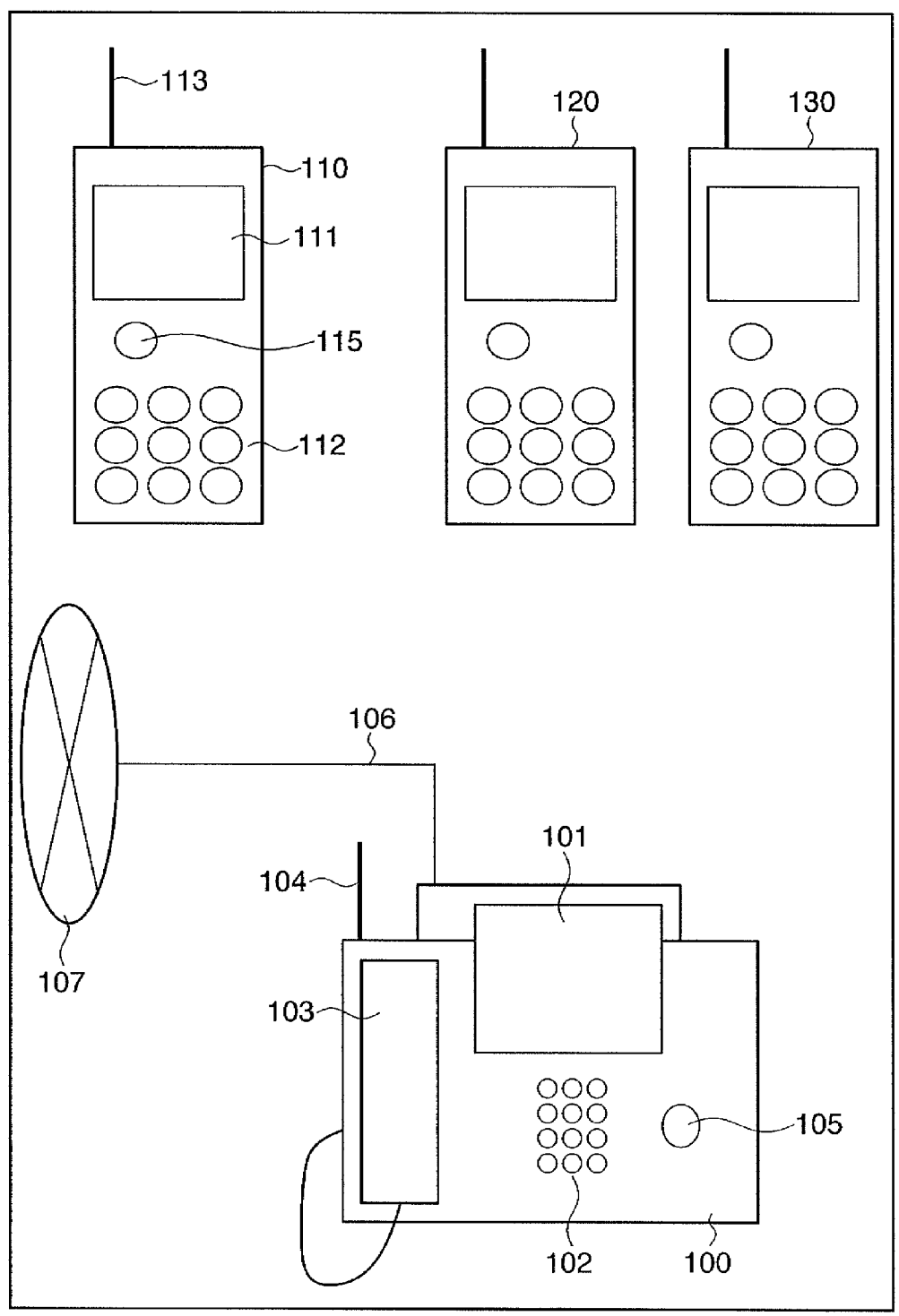
FIG. 1 shows an exemplary configuration of a facsimile machine with cordless answering machine in a first embodiment.

FIG. 1 shows an exemplary configuration of the facsimile (fax) machine with cordless answering machine in the present embodiment. In FIG. 1, reference numeral 100 denotes a base unit with cordless telephone (hereinafter, base unit) of the fax machine. Reference numerals 110, 120 and 130 denote cordless telephone handsets (hereinafter, cordless handsets).

Note that a plurality of cordless handsets can be connected to the base unit 100. In the example shown in FIG. 1, the cordless handsets 120 and 130 have been added as additional cordless handsets, resulting in a configuration that includes three cordless handsets.

As shown in FIG. 1, the base unit 100 has a display unit 101, an operation unit 102, an Answer On button 105 that belongs to the operation unit 102, a base unit handset 103 and an antenna 104, and is connected to a public line 107 via a cable line 106. The antenna 104 is used in wireless communication with the cordless handsets 110 to 130. The display unit 101 is constituted by a color LCD, but may be constituted by a monochrome LCD or the like.

The base unit 100 performs control of the main operations, line control, answering machine control, control of the wireless connection with the cordless handsets, and the like.

On the other hand, the cordless handsets 110 to 130 each have a display unit 111, an operation unit 112, an Answer On button 115 that belongs to the operation unit 112, and an antenna 113. The antenna 113 is used in wireless communication with the base unit 100.

Figure 2:
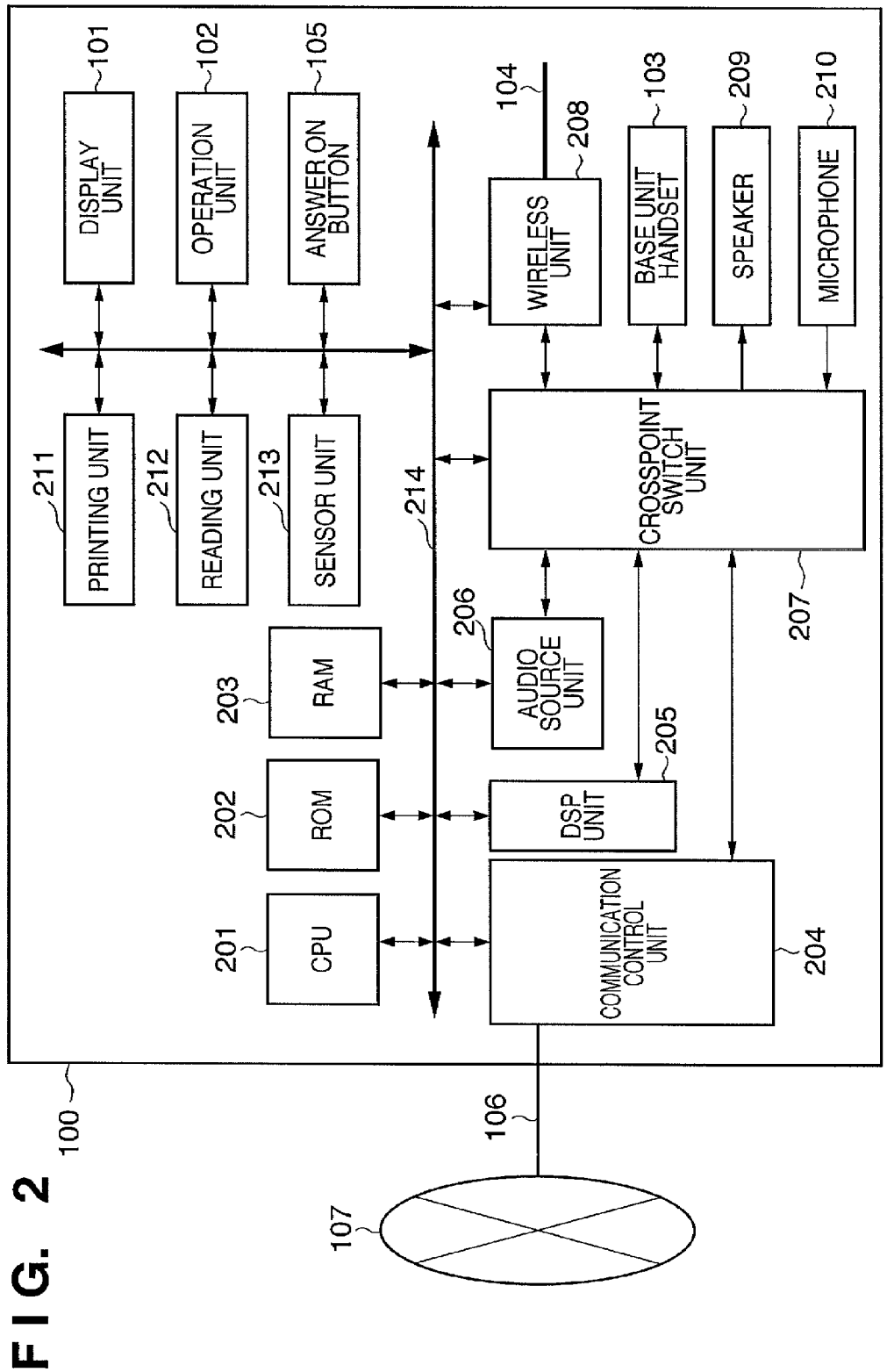
FIG. 2 is a block diagram showing an internal configuration of a base unit with cordless telephone shown in FIG. 1.

FIG. 2 is a block diagram showing an internal configuration of the base unit with cordless telephone shown in FIG. 1. As shown in FIG. 2, the base unit 100 includes a CPU 201, a ROM 202 and a RAM 203, in addition to the display unit 101, the operation unit 102, the base unit handset 103, the antenna 104 and the Answer On button 105 shown in FIG. 1. The base unit 100 further includes a communication control unit 204, a DSP (modem/audio processing) unit 205, an audio source unit 206, a crosspoint switch unit 207, a wireless unit 208, a speaker 209, and a microphone 210. In order to realize a facsimile function, the base unit 100 includes a printing unit 211, a reading unit 212, and a sensor unit 213 for reading originals to send and printing received originals. The above constituent elements (hereinafter, units) are connected to one another via a system bus 214.

The CPU 201 communicates signals and data to and from the units via the system bus 214, and controls the units connected to the system bus 214 according to input signals. That is, the CPU 201 performs controls to execute call processing associated with a telephone conversation and processing associated with the various service functions on a line, in accordance with programs stored in the ROM 202. In the case where the answering machine function is set, the CPU 201 also performs controls to detect the frequency of incoming ringer signals on a line and hold the line when a prescribed frequency is reached, and controls the DSP unit 205 to output the fixed message of the answering machine. The CPU 201 then controls the DSP unit 205 to audio compresses the message from the caller and stores the compressed message in the RAM 203.

The ROM 202 stores control programs of the CPU 201. These control programs include programs for controlling the DSP unit 205 to realize the answering machine, fax transmission/reception, number display, and audio signal input/output (IO).

The RAM 203 is a work memory used when the CPU 201 executes call processing and other answering machine processing. Here, unlike the ROM 202, temporary data is stored in the RAM 203. The RAM 203 may be constituted by an EEPROM or a flash ROM that enable data writing/deletion and backup with batteries or the like, with the requisite device being used according to access speeds and the saving process.

The communication control unit 204 is an interface for housing the public line 107. In the case of analog lines, the communication control unit 204 is connected to a telephone line (hereinafter, subscriber line) of a telephone exchange, and is constituted by a full-wave rectifier circuit using diodes. The communication control unit 204 is further constituted by a polarity coincidence circuit, a ringer detection circuit, a hook switch circuit, and a transformer circuit. Here, the polarity coincidence circuit is for matching the circuit voltage polarities. The ringer detection circuit is for detecting ringing signals from the telephone exchange. The hook switch circuit is for forming a line loop and sending a dial pulse to the exchange when an off-hook operation is performed. The transformer circuit is for performing two to four line transformations.

Note that the communication control unit 204 can also be constituted by a semiconductor. Further, although connected to an analog line in the present embodiment, the communication control unit 204 may be connected to a digital line or a broadband line such as an optical line and ADSL.

The DSP unit 205 is a digital signal processor, and is constituted by a DSP and an analog front end (AFE). Functionally, the DSP unit 205 has an audio compression function, a response message output function, and a message recording function in an audio processing unit used by the answering machine. Further, a facsimile modem function for sending and receiving facsimiles with G3 Fax is also realized under the control of the CPU 201. The DSP unit 205 also has a number display function for analyzing modem data (number display data).

The audio source unit 206 is constituted by an audio source LSI that generates a hold tone and a ringer melody. The crosspoint switch unit 207 performs input/output (IO) switching of various audio signals under the control of the CPU 201. When responding with the answering machine, the response message is send from the DSP unit 205 to the cable line 106 and the speaker 209 via the communication control unit 204 under the control of the CPU 201. When recording a message, the incoming signal from the cable line 106 is connected to the DSP unit 205 and output from the speaker 209 under the control of the CPU 201. Here, if the cordless handset 110 responds, the crosspoint switch unit 207 performs IO switching so as to connect the wireless unit 208 and the communication control unit 204.

The crosspoint switch unit 207 thus switches the signals from the DSP unit 205 and the analog IO signals from the audio source unit 206, the base unit handset 103, the speaker 209, the microphone 210, the wireless unit 208 and the like to the communication control unit 204. Transmission of audio signals to and from the connected cordless handset 110 is switched at this point and connected to the line to establish an outside call, or connected to the base unit handset 103 to establish an internal call. Deletion is also possible if the connection processing is simple.

The speaker 209 and the microphone 210 respectively perform audio output and input, but a so-called handsfree function for having a telephone conversation without using the base unit handset 103 may be provided.

Control data and audio signals are modulated by the wireless unit 208 and sent to the antenna 104 after being converted to a wireless transmission format. The wireless unit 208 also extracts demodulated data from information wirelessly received from the base unit antenna 104. Here, control data is output to the CPU 201, and analog signals such as demodulated audio and unmodulated audio signals are sent to and from the crosspoint switch unit 207.

The wireless unit 208 includes a baseband unit having a modem/converter function and privacy/amplifier function, in order to connect with the cordless handsets 110 to 130. Modulated signals from the baseband unit are sent to the antenna 104 after being converted to a wireless transmission format.

The modulated signals are extracted from signals wirelessly received from the base unit antenna 104 and are output to the baseband unit.

Here, to talk with the cordless handset 110, the communication control unit 204 detects an incoming call, and activates a reception signal with respect to the wireless unit 208, and the wireless unit 208 modulates the call data signal to a wireless signal, and sends the wireless signal to the cordless handset 110. As a result of responding to this signal with the cordless handset 110, the communication control unit 204 connects the incoming call and connects the wireless unit 208 via the crosspoint switch unit 207 to establish a wireless call. In the case of notifying the state of the base unit 100 to the cordless handset 110, the CPU 201 performs determinations such as determining the state of the answering machine or whether a message is recorded, and transmits this information to the cordless handset 110 via the wireless unit 208. In the case of activating the answering machine of the base unit 100 from the cordless handset 110, the information is received at the wireless unit 208, where the data is demodulated, and the CPU 201 analyzes the demodulated data and performs a control in accordance with the resultant state.

Further, the CPU 201 functions as a setting unit for monitoring a wireless communication state as to whether the base unit 100 and the cordless handset 110 are engaged in wireless communication, monitoring the setting state of the answering machine, and setting and canceling the answering machine. Note that controls between the base unit 100 and the other cordless handsets 120 and 130 are similar to the above controls between the base unit 100 and the cordless handset 110.

The CPU 201 also performs the processing of the printing unit 211, the reading unit 212, and the sensor unit 213 which performs original detection and the like.

The display unit 101 displays recorded message information of the answering machine, time, the line state during communication, and error and other states. The display unit 101 also displays received text messages and text messages that have been key input from the operation unit 102, which performs key input and the like. The display unit 101 further displays the setting content of the various service functions of the base unit 100. Here, reception of a message or a FAX is notified to the user with the LCD or LED.

The operation unit 102 includes a dial key for inputting alphabet characters, symbols and the like using keys such as 0 to 9, * and #, in order to input dial numbers, URLs and the like. The operation unit 102 further includes keys such as a Send key and a Receive key for controlling transmission/reception of facsimiles, an Off-Hook key for switching the line on/off, and a Select key for performing function setting. The Answer On button 105 is also included in the operation unit 102, and is used to set and cancel the answering machine function of the base unit 100, and to set and cancel the answering machine function during an incoming call.

Figure 3:
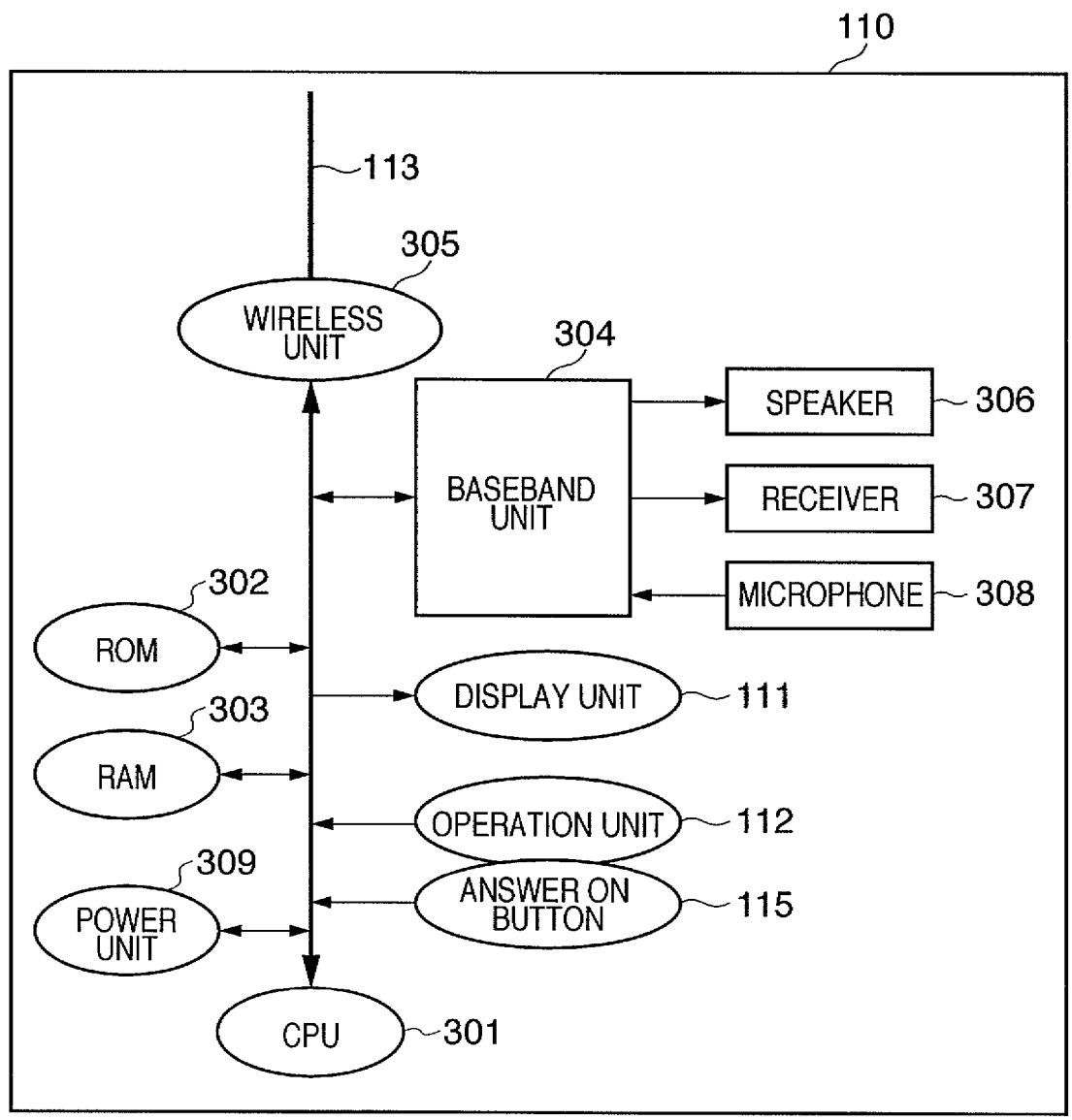
FIG. 3 is a block diagram showing an internal configuration of a cordless telephone handset shown in FIG. 1.

FIG. 3 is a block diagram showing an internal configuration of the cordless telephone handsets shown in FIG. 1. Note that since the internal configurations of the cordless handsets 110 to 130 are respectively the same, the internal configuration of the cordless handset 110 will be described here as an example. As shown in FIG. 3, the cordless handset 110 includes a CPU 301, a ROM 302 and a RAM 303, in addition to the display unit 111, the operation unit 112, the cordless handset antenna 113 and the Answer On button 115 shown in FIG. 1. The cordless handset 110 further includes a baseband unit 304, a wireless unit 305, a speaker 306, a receiver 307, a microphone 308 and a power supply 309.

The CPU 301 controls the entire cordless handset 110. Specifically, this includes processing of key operation from the operation unit 112, display processing, control of the wireless connection with the base unit 100, modulation/demodulation control, analog-to-digital (AD) conversion, and audio processing. The ROM 302 is a memory that stores control programs of the CPU 301. The RAM 303 is a working memory used by the CPU 301 when executing controls, and an area for temporarily storing information rewritten in real time and data that will not be saved. The ROM 302 further includes a table for managing the answering machine state of the base unit 100 and the like.

The RAM 303 may be constituted by an EEPROM for storing call signs (system IDs) as an answering machine, cordless handset numbers or the like or a flash ROM for storing phone book data, and is used depending on access speed and saving requirements.

The operation unit 112 includes function keys such as a Dial key, a Talk key, an Off key, a Hold key, a Speaker key, and a Phone Book key. The Answer On button 115 is also included in the operation unit 112, though it functions as an operation key for controlling the answering machine function of the base unit 100. This Answer On button 115 can also indicate the state of the answering machine function with the LED. The Answer On button 115 lights up when the answering machine function has been set, flashes when a message has been recorded, and does not light up when the answering machine function has been cancelled. The cordless handset 110 operates as described above when on the battery charger, although when the cordless handset 110 is not being charged, the Answer On button 115 does not light up or flash so as to reduce battery consumption.

The display unit 111 is constituted by an LCD, LED or the like, and performs displays for notifying time and incoming calls, operation menu and phone book display, display of dial numbers input from the operation unit 112, and display of the use condition of the public line, the condition of radio waves, and the like. The display unit 111 can also display the setting state of the answering machine on the LCD in order to show the state of the base unit 100.

The baseband unit 304 has a modem/converter function, and a privacy/amplifier function, and enables transmission/reception of control data and audio signals. If the cordless handset 110 is a digital cordless handset, the baseband unit 304 will also have an analog-to-digital (AD) conversion function and an audio compression function. The wireless unit 305 processes modulated and demodulated signals. The power supply 309 is constituted by a rechargeable secondary battery.

In the above configuration, the wireless unit 305 of the cordless handset 110 receives information regarding the base unit state transmitted from the base unit 100, via the antenna 113. Here, the baseband unit 304 demodulates the received information, and the CPU 301 converts the demodulated information to analyzable data. The baseband unit 304 finds out the state of the answering machine from the received data. Further, in the case of setting the answering machine function by pressing the Answer On button 115 of the cordless handset 110, the baseband unit 304 transmits answering machine setting data to the base unit 100 via the wireless unit 305 under the control of the CPU 301, and the wireless unit 208 of the base unit 100 receives that data. The wireless unit 208 outputs a request to set the answering machine function to the CPU 201 based on the command of the settings of the answering machine function. The CPU 201 analyzes the setting request and changes the state to a state in which the answering machine function is set.

Next, answering machine processing in the base unit 100 and the cordless handsets 110 and 130 having the above configurations will be described using FIGS. 4 to 9. This answering machine processing is performed in accordance with the result of the CPU 201 of the base unit 100 confirming content to be confirmed by monitoring the above states. Controls performed in the case where the answering machine is set from the base unit 100 and from the cordless handsets 110 to 130 will also be described.

Figure 4:
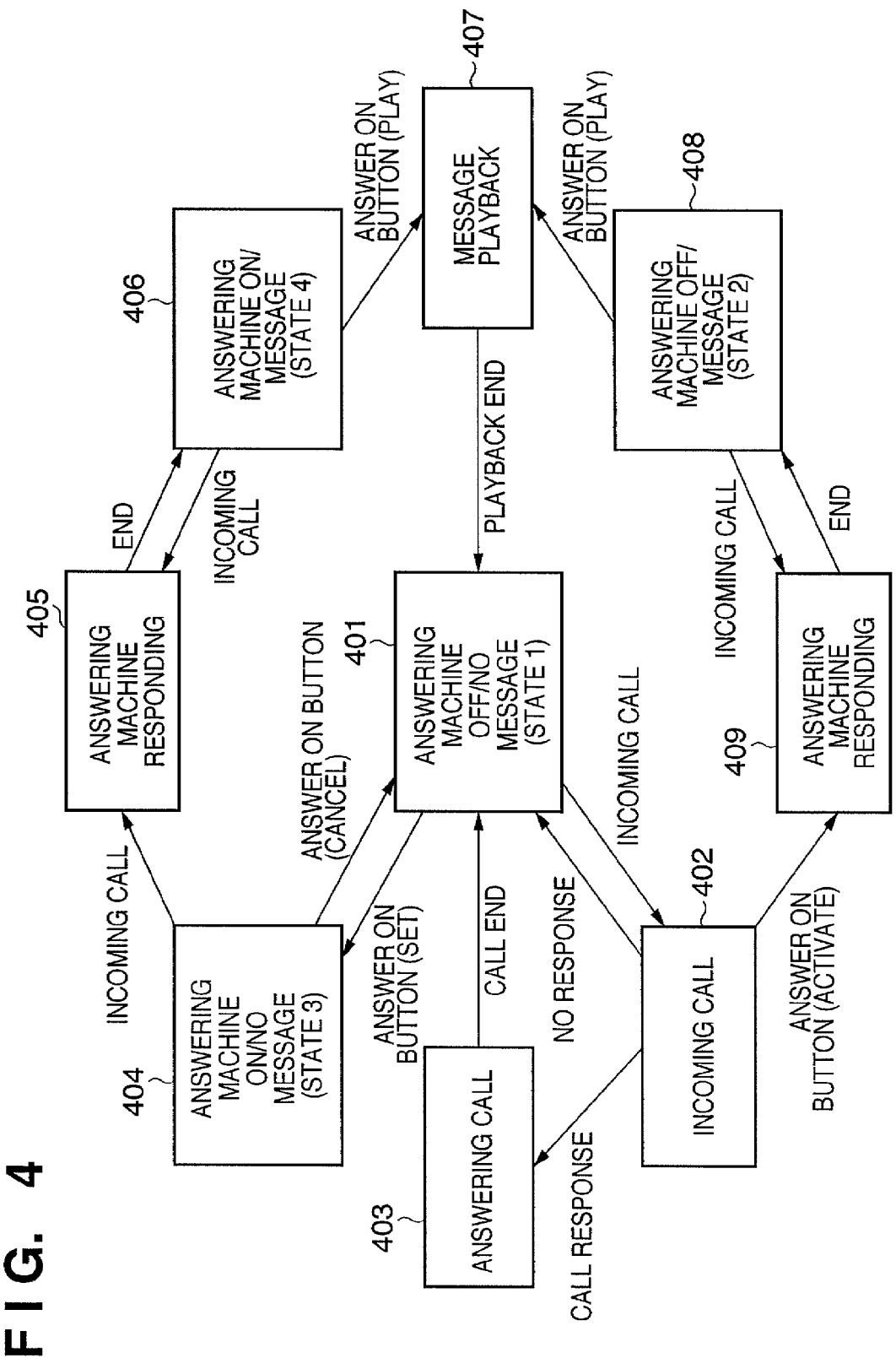
FIG. 4 shows the transition between various states of the answering machine function in the first embodiment.

FIG. 4 shows the transition between the various states of the answering machine function in the present embodiment. In FIG. 4, reference numeral 401 denotes a state 1 in which the answering machine function is cancelled (off) and there is no message recorded. Reference numeral 402 denotes an incoming call in state 1, with the ringtone sounding from the speaker 209 of the base unit 100 and the speaker 306 of the cordless handsets 110 to 130. Note that the base unit 100 and the cordless handsets 110 to 130 sounds the ringtone is preset separately for the base unit 100 and the cordless handsets 110 to 130 as system settings.

Reference numeral 403 denotes the call being answered. In this state, the crosspoint switch unit 207 is controlled to establish a call path (that also includes wireless unit 208) when there is a call response to the incoming call using the handset 103 of the base unit 100 or the Talk button of the cordless handsets 110 to 130. Reference numeral 404 denotes a state 3 in which the answering machine function has been set (on) using the Answer On button 105 of the base unit 100 or the Answer On button 115 of the cordless handsets 110 to 130 in state 1, and there are no messages recorded. Reference numeral 405 denotes responding with the answering machine. In this state, the answering machine automatically responds when there is an incoming call in state 3 or a state 4 (described below), and a message sent from the caller is recorded.

Reference numeral 406 denotes state 4 in which the answering machine function is set, and a message has been recorded. Reference numeral 407 denotes message playback, whereby the recorded message is played when the Answer On button 105 of the base unit 100 or the Answer On button 115 of the cordless handsets 110 to 130 is pressed. Reference numeral 408 denotes a state 2 that arises when the Answer On button 105 of the base unit 100 or the Answer On button 115 of the cordless handsets 110 to 130 is pressed during an incoming call in state 1. Reference numeral 409 denotes responding with the answering machine. In this state, the answering machine function has been activated in response to an incoming call in the case where the Answer On button 105 of the base unit 100 or the Answer On button 115 of the cordless handsets 110 to 130 was pressed during the incoming call.

Next, processing in the above states 1 to 4 of the answering machine function will be described using FIGS. 5 to 9. Firstly, processing in state 1 of the answering machine function will be described using FIG. 5.

Figure 5:
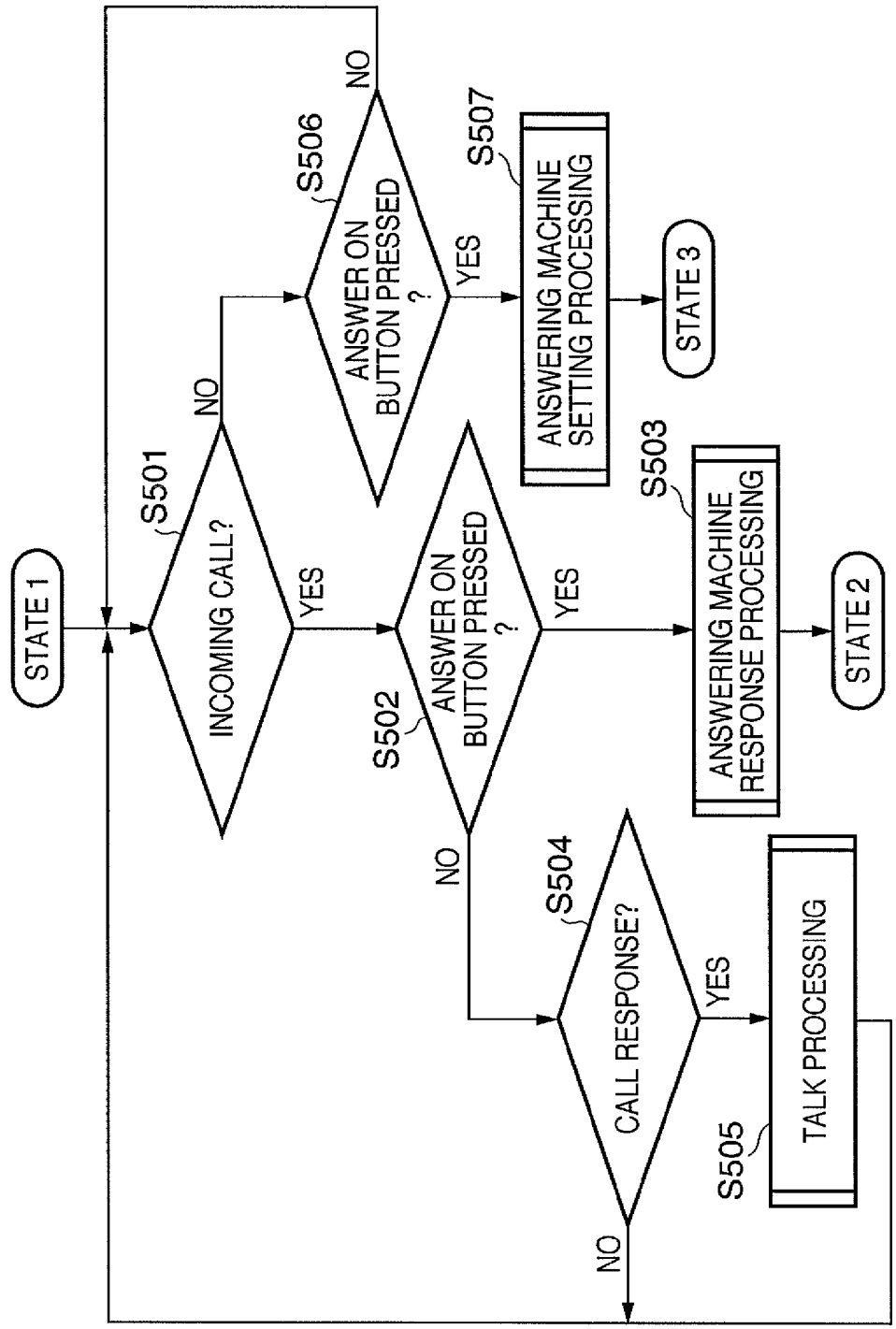
FIG. 5 is a flowchart showing a processing procedure in a state 1 of the answering machine function.

FIG. 5 is a flowchart showing a processing procedure in state 1 of the answering machine function. Firstly, in step S501, the communication control unit 204 monitors for incoming calls on the public line 107, and proceeds to step S502 when an incoming call is detected. In this step S502, it is determined whether the Answer On button 105 of the base unit 100 or the Answer On button 115 of the cordless handsets 110 to 130 has been pressed. Here, the processing proceeds to step S503 if one of the Answer On buttons has been pressed, and executes answering machine response processing, which will be described in detail using FIG. 9, before transferring the answering machine function to state 2.

If, in step S502, none of the Answer On buttons have been pressed, the processing proceeds to step S504, and it is determined whether there has been a call response using the handset 103 of the base unit 100 or the Talk button of the cordless handsets 110 to 130. Here, the processing proceeds to step S505 if there has been a call response, and normal talk processing is performed that involves establishing a call path with the base unit handset 103 if the call response was from the base unit 100, and establishing a call path with the cordless handset via the wireless unit 208 if the call response was from one of the cordless handsets 110 to 130. The processing is returned to step S501 if there was no call response.

On the other hand, if there is not an incoming call (standby state) in step S501, it is determined in step S506 whether the Answer On button 105 of the base unit 100 or the Answer On button 115 of the cordless handsets 110 to 130 has been pressed. Here, if none of the Answer On buttons have been pressed, the processing is returned to step S501 and the above determination processing is repeated. If one of the Answer On buttons has been pressed, the processing proceeds to step S507, and performs answering machine setting processing to transfer the answering machine function to state 3. This answering machine setting processing involves setting the table of the answering machine function managed by the RAM 203 of the base unit 100.

Figure 6:
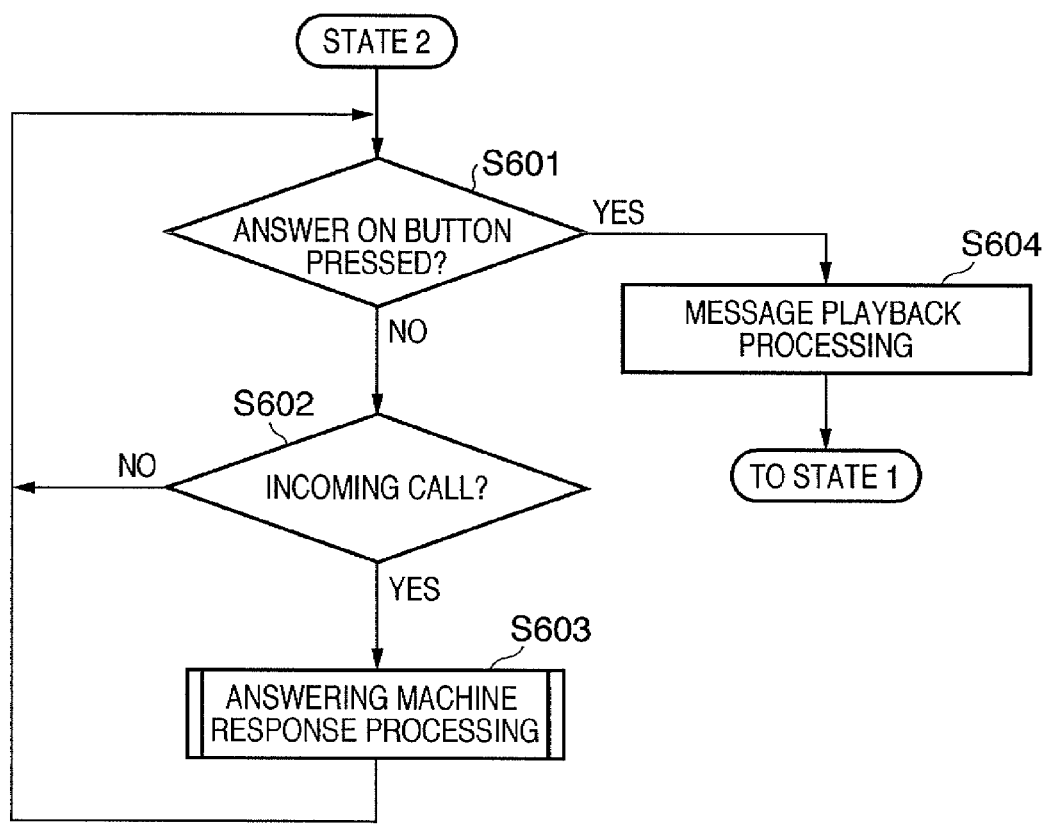
FIG. 6 is a flowchart showing a processing procedure in a state 2 of the answering machine function.

Next, processing in state 2 of the answering machine function will be described using FIG. 6. FIG. 6 is a flowchart showing a processing procedure in state 2 of the answering machine function.

Figure 9:
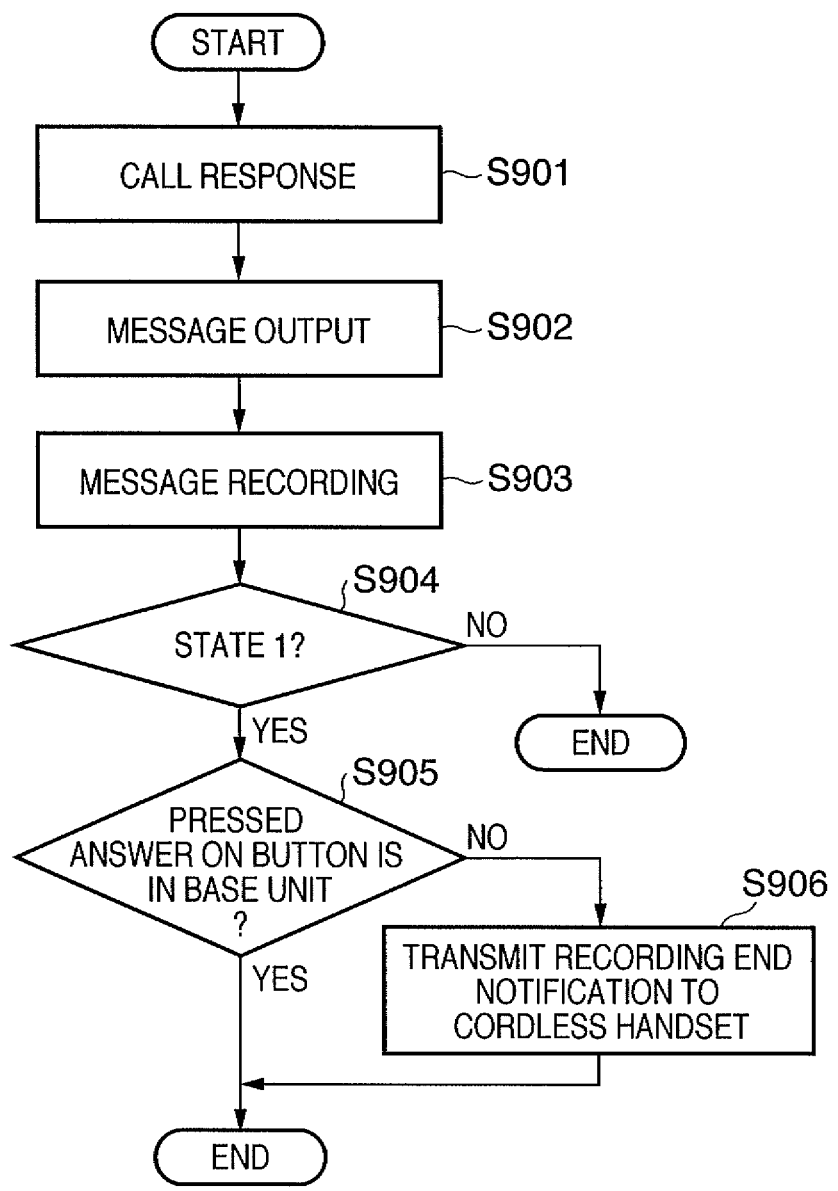
FIG. 9 is a flowchart showing answering machine response processing in the first embodiment.

Firstly, in step S601, it is determined whether the Answer On button 105 of the base unit 100 or the Answer On button 115 of the cordless handsets 110 to 130 has been pressed. Here, if none of the Answer On buttons have been pressed, the processing proceeds to step S602 and it is determined whether there is an incoming call. Here, the processing is returned to step S601 if there is not an incoming call. If there is an incoming call, the processing proceeds to step S603 and answering machine response processing, which will be described in detail using FIG. 9, is performed before returning to step S601.

On the other hand, if in step S601 one of the Answer On buttons has been pressed, the processing proceeds to step S604. In step S604, the message playback processing is performed for playing a message recorded in the answering machine response processing, and transfers the answering machine function to state 1.

Figure 7:
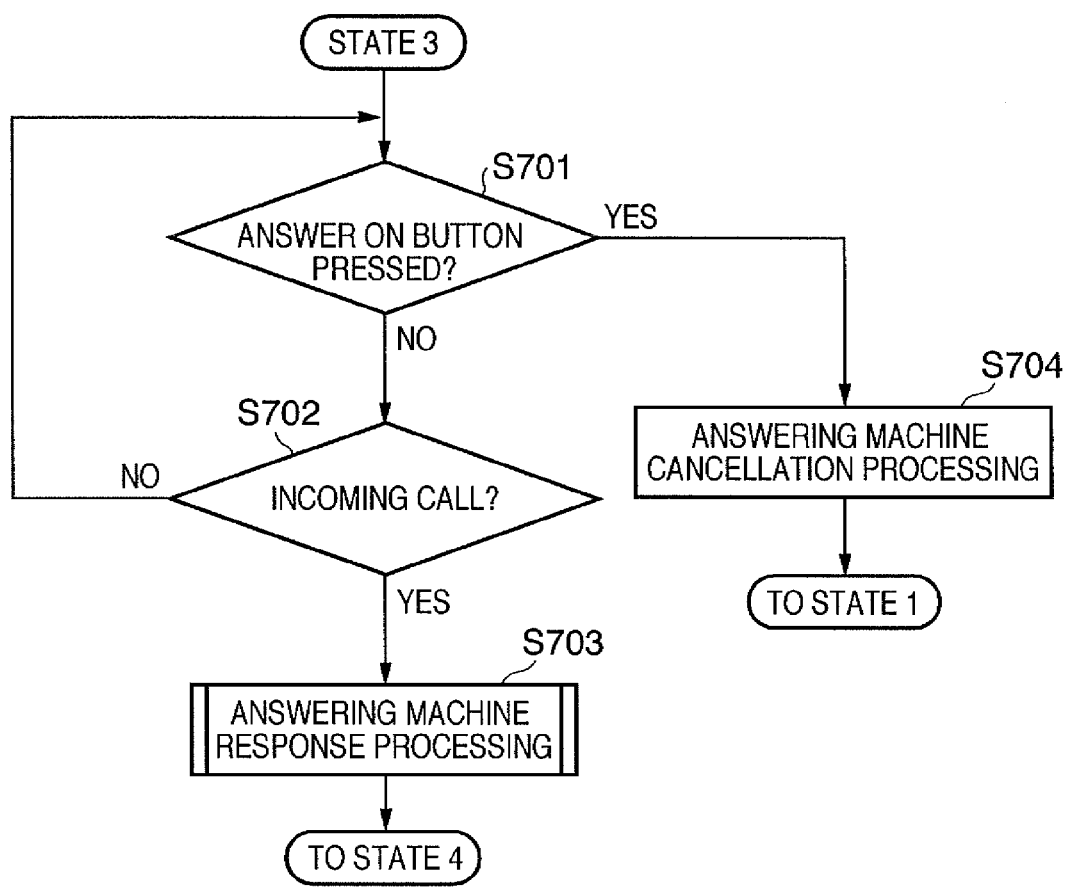
FIG. 7 is a flowchart showing a processing procedure in a state 3 of the answering machine function.

Next, processing in state 3 of the answering machine function will be described using FIG. 7. FIG. 7 is a flowchart showing a processing procedure in state 3 of the answering machine function.

Firstly, in step S701, it is determined whether the Answer On button 105 of the base unit 100 or the Answer On button 115 of the cordless handsets 110 to 130 has been pressed. Here, if none of the Answer On buttons have been pressed, the processing proceeds to step S702 and it is determined whether there is an incoming call. Here, the processing is returned to step S701 if there is not an incoming call. If there is an incoming call, the processing proceeds to step S703, answering machine response processing, which will be described in detail using FIG. 9, is performed and the answering machine function is transferred to state 4.

On the other hand, if in step S701 one of the Answer On buttons has been pressed, the processing proceeds to step S704. Since the answering machine function is set, in step S704, the answering machine function is cancelled, and transferred to state 1. The processing to cancel the answering machine function involves canceling the setting the table of the answering machine function managed by the RAM 203 of the base unit 100.

Figure 8:
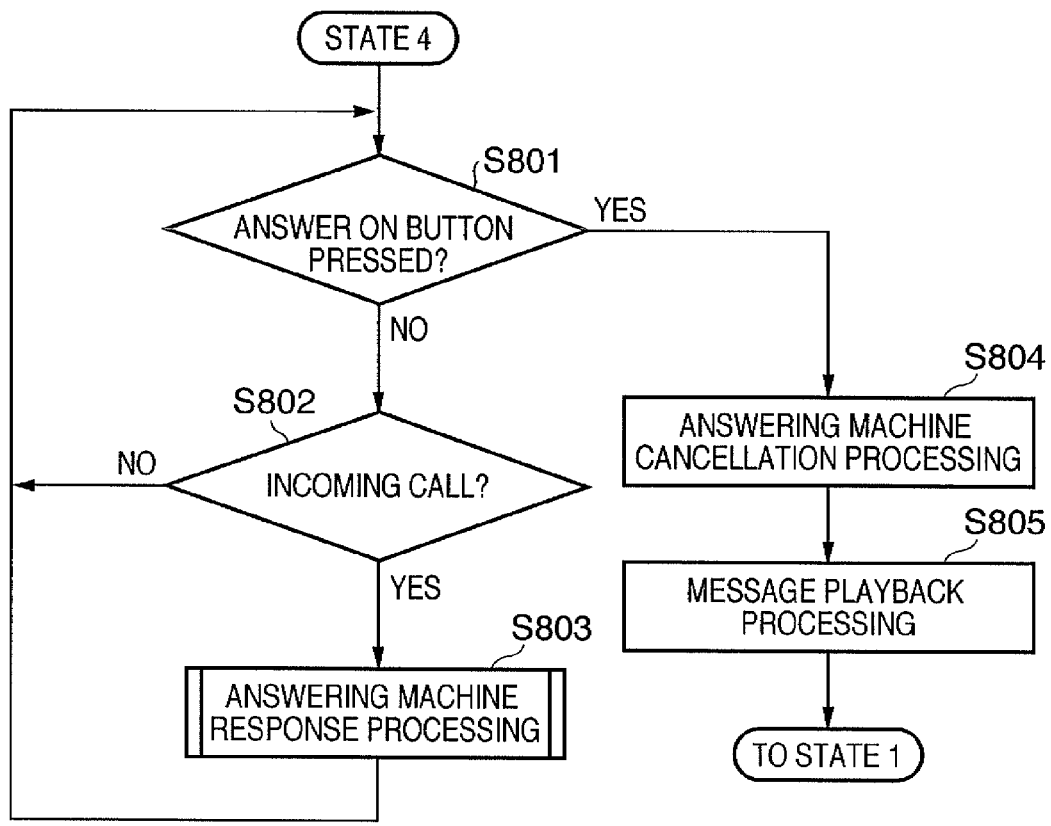
FIG. 8 is a flowchart showing a processing procedure in a state 4 of the answering machine function.

Next, processing in state 4 of the answering machine function will be described using FIG. 8. FIG. 8 is a flowchart showing a processing procedure in state 4 of the answering machine function.

Firstly, in step S801, it is determined whether the Answer On button 105 of the base unit 100 or the Answer On button 115 of the cordless handsets 110 to 130 has been pressed. Here, if none of the Answer On buttons have been pressed, the processing proceeds to step S802 and it is determined whether there is an incoming call. Here, the processing is returned to step S801 if there is not an incoming call. If there is an incoming call, the processing proceeds to step S803, answering machine response processing, which will be described in detail using FIG. 9, is executed and the processing is returned to step S801.

On the other hand, if in step S801 one of the Answer On buttons has been pressed, the processing proceeds to step S804. Since the answering machine function is set, in step S804, the answering machine function is cancelled. Then, in step S805, message playback processing is performed for playing a message recorded in the answering machine response processing, and the answering machine function is transferred to state 1.

Here, the answering machine response processing executed in the above states 1 to 4 will be described in detail using FIG. 9.

FIG. 9 is a flowchart showing answering machine response processing in the present embodiment. Firstly, in step S901, the communication control unit 204 inverts the polarity and responds to the incoming call. Next, in step S902, a prerecorded answering machine response message is sent out. Then, in step S903, audio sent from the caller is converted to a digital signal, and the digital signal is recorded to the RAM 203 as a message. The processing up till this point is in common with normal answering machine response processing.

Next, in step S904, it is determined whether the answering machine function is in state 1, and the processing is ended if not in state 1. Here, if in state 1, the processing proceeds to step S905 and it is determined whether the pressed Answer On button was in the base unit 100. Here, if the pressed Answer On button was in the base unit 100, the processing is ended. If the Answer On button 115 of one of the cordless handsets 110 to 130 was pressed, the processing proceeds to step S906, transmits a message recording end notification to the cordless handset whose Answer On button 115 was pressed, and ends the processing.

Next, the processing of the base unit 100 and the cordless handset 110 in the case where the Answer On button 115 of the cordless handset 110 is pressed when there is an incoming call on an outside line in the above state 1 will be described using FIG. 10.

Figure 10:
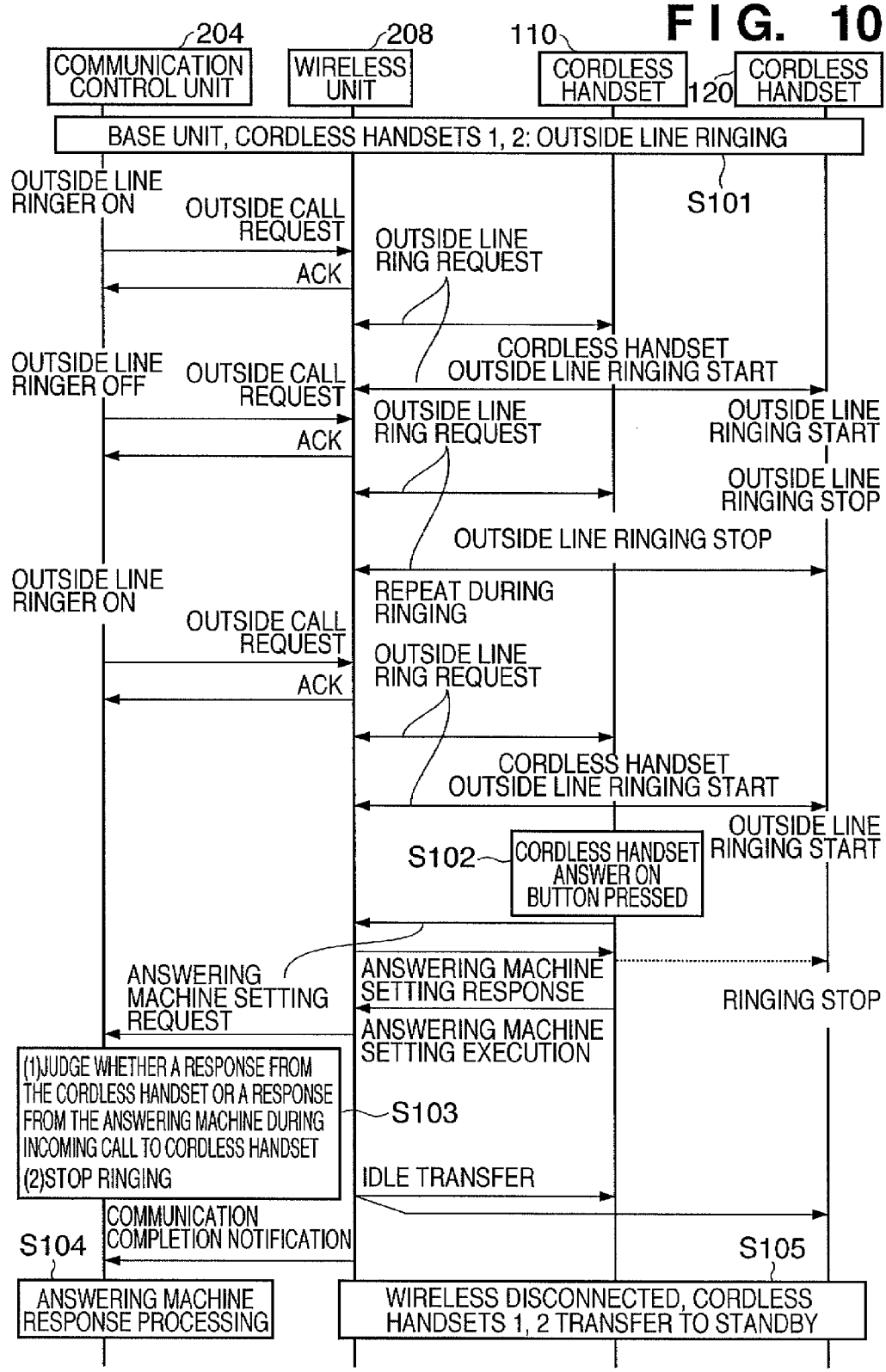
FIG. 10 shows processing in the case where an Answer On button of a cordless handset is pressed during an incoming call in state 1 of the first embodiment.

FIG. 10 shows processing in the case where the Answer On button on a cordless handset is pressed during an incoming call in state 1 of the present embodiment. Firstly, in step S101, the communication control unit 204 controls the base unit 100 and the cordless handsets 110 and 120 during the ringing on the outside line when the answering machine function is in state 1 and an incoming call is detected. Specifically, the communication control unit 204 transmits an outside call request to the wireless unit 208 in accordance with outside line ringer on information, with the ringing signal being received on the line, and receives an ACK. The wireless unit 208 thus sends an outside line ring request to the wirelessly connected cordless handsets 110 and 120. Outside line ringer off information is then also send to the wirelessly connected cordless handsets 110 and 120, similarly to the outside line ringer on information. The ringtone is sounded by repeating this processing.

If, in step S102, the Answer On button 115 of the cordless handset 110 is pressed during an incoming call in state 1, an answering machine setting request is send from the cordless handset 110 to the wireless unit 208. The wireless unit 208 thus returns an answering machine setting response to the cordless handset 110, and receives an answering machine setting execution from the cordless handset 110. Next, the wireless unit 208 sends a command as an answering machine setting request to the communication control unit 204. Here, when the communication control unit 204 receives the answering machine setting request from the wireless unit 208, the CPU 201 determines in step S103 whether the request is for a response from the cordless handset or a response from the answering machine during the incoming call. In this case, it is determined that the request is for activation of the answering machine function by the cordless handset 110 during an incoming call, and a control is performed so as to perform automatic call response and stop the ringing. Then, in step S104, answering machine response processing is performed as described above. Note that the processing to notify recording completion to the cordless handset 110 after a message has been recorded will be described below using FIG. 11.

Also, similarly to the processing in step S103, the wireless unit 208 transfers the wirelessly connected cordless handsets 110 and 120 to an idle state, and transmits a communication completion notification to the communication control unit 204. The wireless connection is thus disconnected in step S105, and the cordless handsets 110 and 120 transfer to a standby state.

Next, the processing of the base unit 100 and the cordless handset 110 after a message has been recorded in the case where the Answer On button 115 of the cordless handset 110 was pressed during an incoming call in state 1 will be described using FIG. 11.

Figure 11:
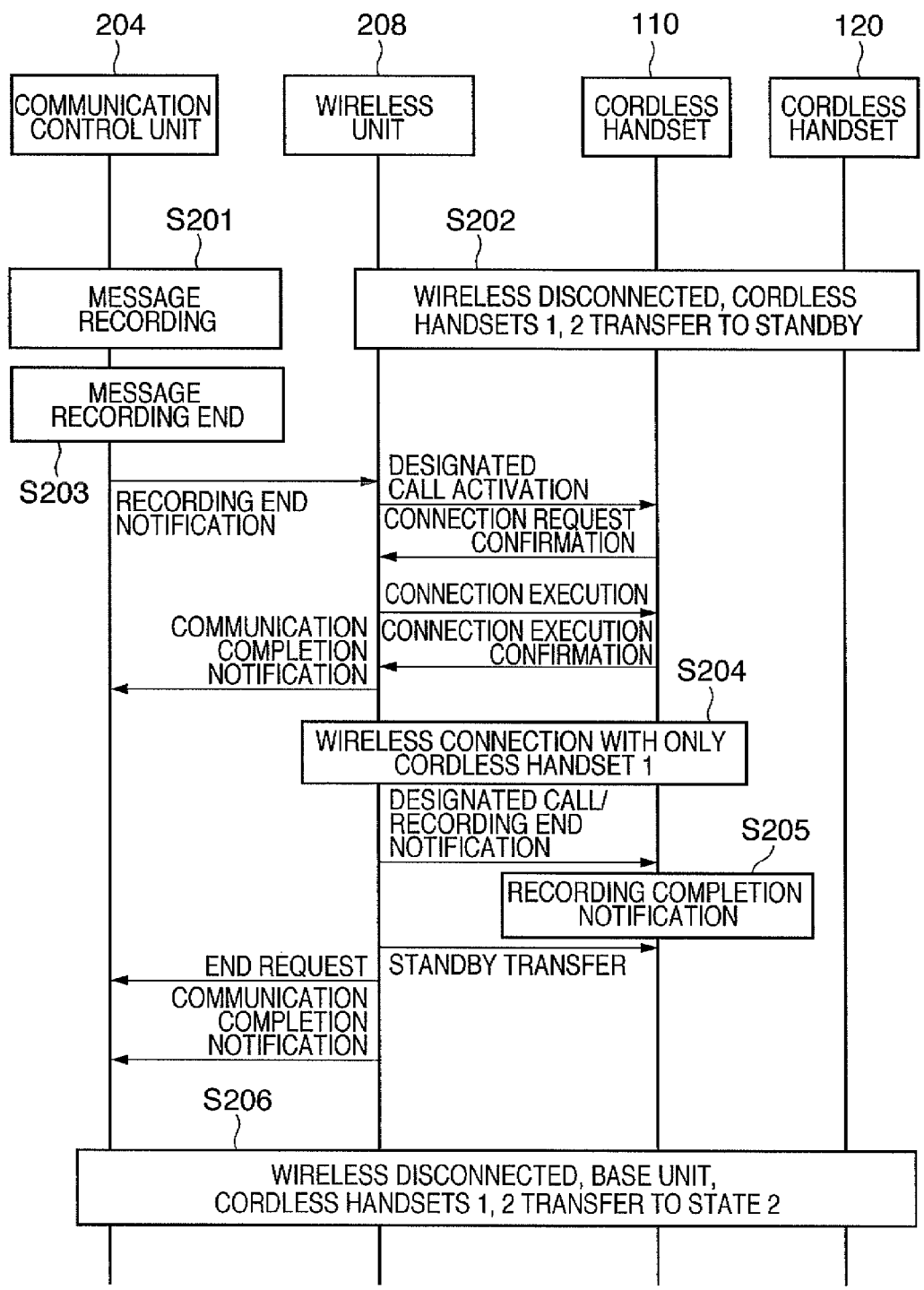
FIG. 11 shows processing performed after the start of the answering machine response processing shown in FIG. 10.

FIG. 11 shows processing performed after the start of the answering machine response processing shown in FIG. 10. Firstly, in step S201, the DSP unit 205 starts recording a message, and in step S202, the cordless handsets 110 and 120 revert to a standby state. Then, once the message has been recorded, the communication control unit 204, in step S203, sends a recording end notification to the wireless unit 208. The wireless unit 208 thus performs designated call activation with respect to the cordless handset 110 whose the Answer On button 115 was pressed.

On the other hand, the cordless handset 110, on receiving the designated call activation, transmits a connection request confirmation to the wireless unit 208, and on receipt of a connection execution, transits a connection execution confirmation. The wireless unit 208 thus transmits a communication completion notification to the communication control unit 204 after having transferred to a connected state, and in step S204 enters a wireless connected state with only the cordless handset 110.

Next, the wireless unit 208 transmits a designated call/recording completion notification to the cordless handset 110, and the cordless handset 110, on receiving this notification, notifies the user in step S205 that recording is completed. Specifically, the cordless handset 110 notifies the user by displaying on the display unit 111 that a message has been recorded, or by causing the LED of the Answer On button 115 to flash. Then, after the recording completion notification, the wireless unit 208 instructs the cordless handset 110 to transfer to standby, and sends an end request and a communication completion notification to the communication control unit 204.

In step S206, the communication control unit 204 thus disconnects the wireless connection and transfers the base unit 100 and the cordless handsets 110 and 120 to state 2 of the answering machine function.

The present embodiment enables an answering machine function to be activated with the Answer On button of a cordless handset, and a message to be recorded by the answering machine when the user is removed from the base unit or when the user is unable answer the call, thereby obtaining effects that include avoiding nuisance calls (unwanted calls).

By notifying the end of message recording, the user can be reliably notified that recording has ended, thereby enabling recorded messages to be checked without performing unnecessary operations.

Further, associating a single Answer On button with different operations in the various state of the answering machine function enables operability to be improved, since the user does not need to perform cumbersome operations.

Second Embodiment

Next, a second embodiment according to the preset invention will be described in detail with reference to the drawings. In the second embodiment, processing performed in the case where an Answer On button is pressed before automatic call response is performed in the above state 3 or 4 of the answering machine function will be described.

Note that the facsimile (fax) machine with cordless answering machine shown in FIGS. 1 to 3 is also described in the additional embodiment as an example of a communication apparatus having an answering machine function.

Figure 12:
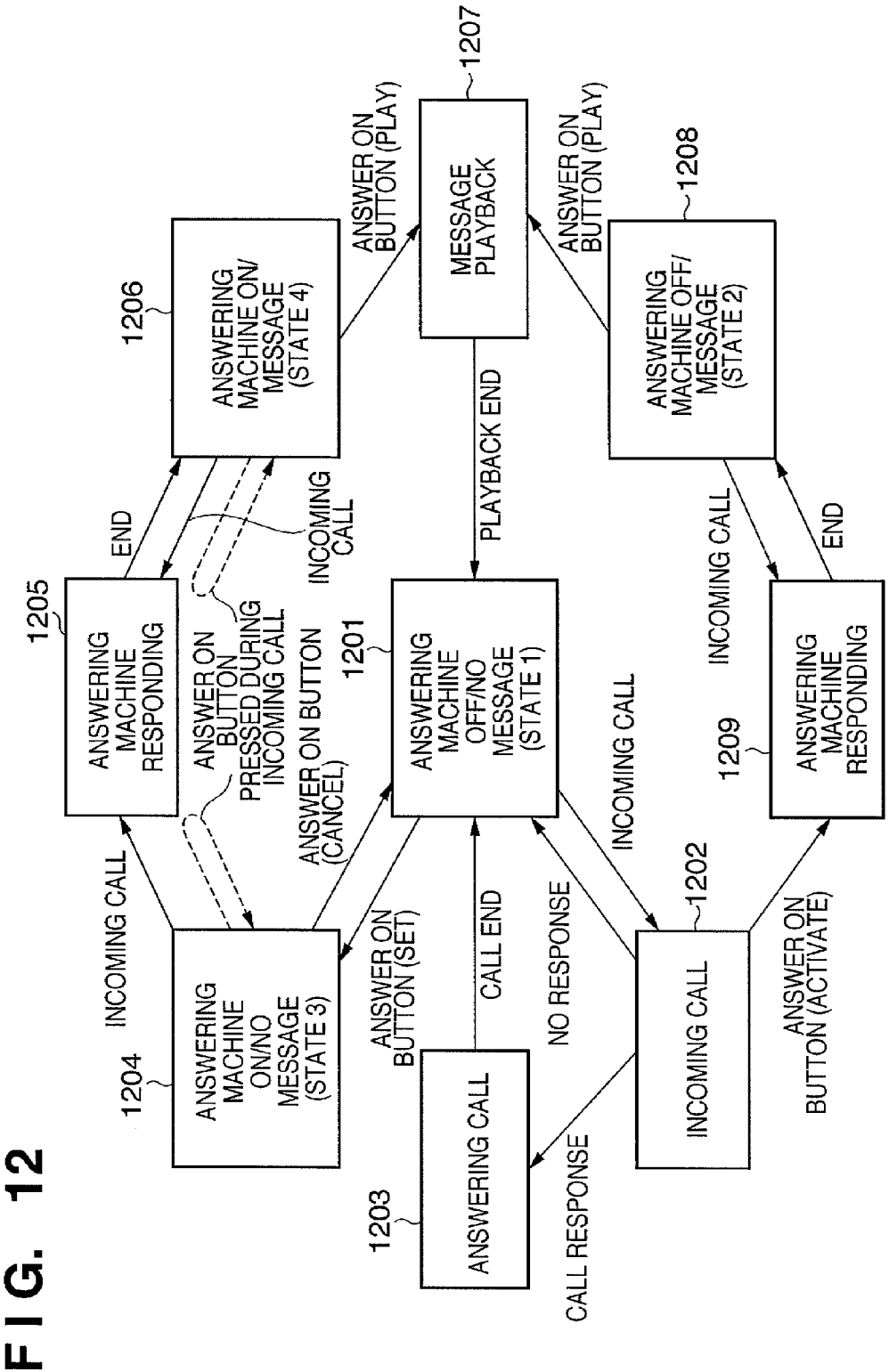
FIG. 12 shows the transition between various states of the answering machine function in a second embodiment.

FIG. 12 shows the transition between the various states of the answering machine function in the second embodiment. Note that states 1201 to 1209 shown in FIG. 12 correspond to the states 401 to 409 shown in FIG. 4. Since states 1 and 2 are similar to the foregoing embodiment, only the processing in states 3 and 4 will be described here.

As shown in FIG. 12, in the second embodiment, the answering machine function is cancelled without performing answering machine response processing in the case where an Answer On button is pressed during an incoming call in state 3 or 4 of the answering machine function.

Figure 13:
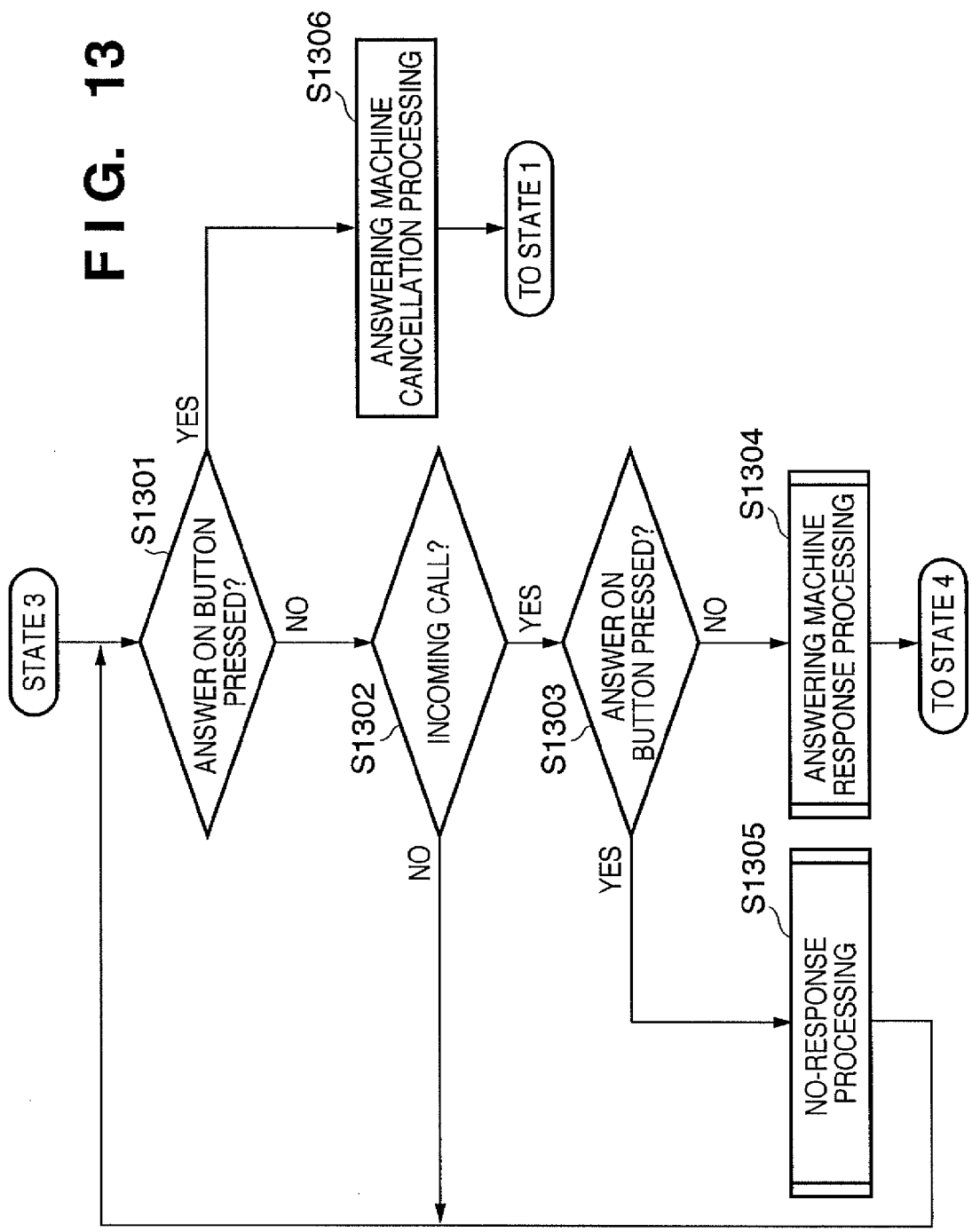
FIG. 13 is a flowchart showing a processing procedure in a state 3 of the second embodiment.
Figure 15:
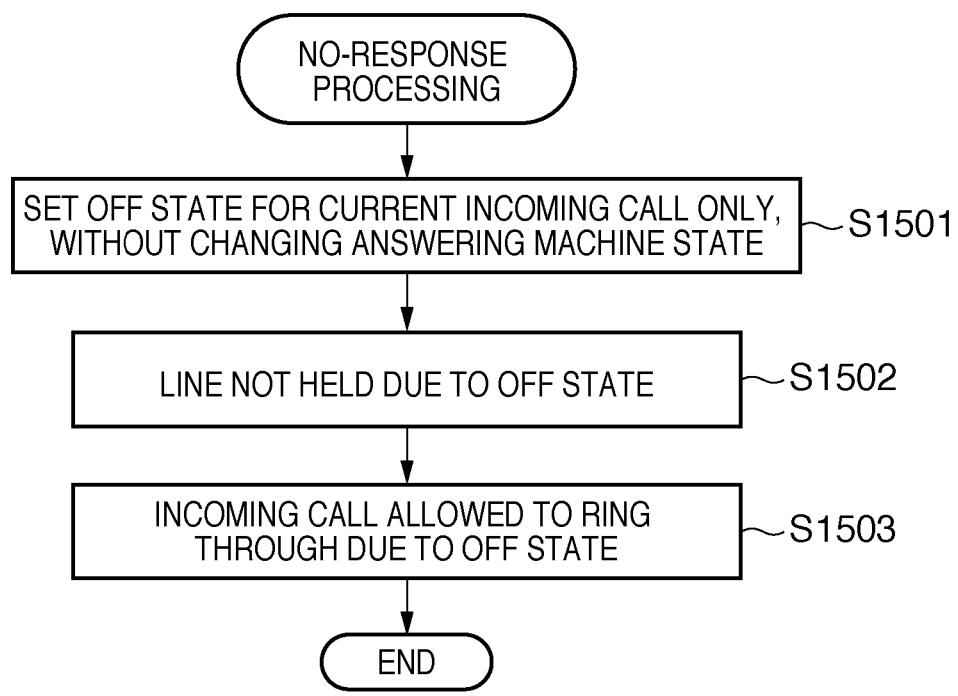
FIG. 15 is a flowchart showing no-response processing in the second embodiment.

FIG. 13 is a flowchart showing a processing procedure in state 3 of the second embodiment. Firstly, in step S1301, it is determined whether the Answer On button 105 of the base unit 100 or the Answer On button 115 of the cordless handsets 110 to 130 has been pressed. Here, if none of the Answer On buttons have been pressed, the processing proceeds to step S1302 and it is determined whether there is an incoming call. Here, the processing is returned to step S1301 if there is not an incoming call, and proceeds to step S1303 if there is an incoming call. In step S1303, it is determined whether the Answer On button 105 of the base unit 100 or the Answer On button 115 of the cordless handsets 110 to 130 is pressed, in the period until the preset automatic response is performed with respect to the incoming call. Here, if none of the Answer On buttons are pressed, the processing proceeds to step S1304, executes the answering machine response processing shown in FIG. 9, and transfers the answering machine function to state 4. If one of the Answer On buttons is pressed, the processing proceeds to step S1305, and no-response processing which will be described in detail using FIG. 15 is executed.

On the other hand, if at the above step S1301 one of the Answer On buttons has been pressed, the processing proceeds to step S1306. Since the answering machine function is set, in step S1306, the answering machine function is cancelled, and transferred to state 1. The processing to cancel the answering machine function involves canceling the setting the table of the answering machine function managed by the RAM 203 of the base unit 100.

Figure 14:
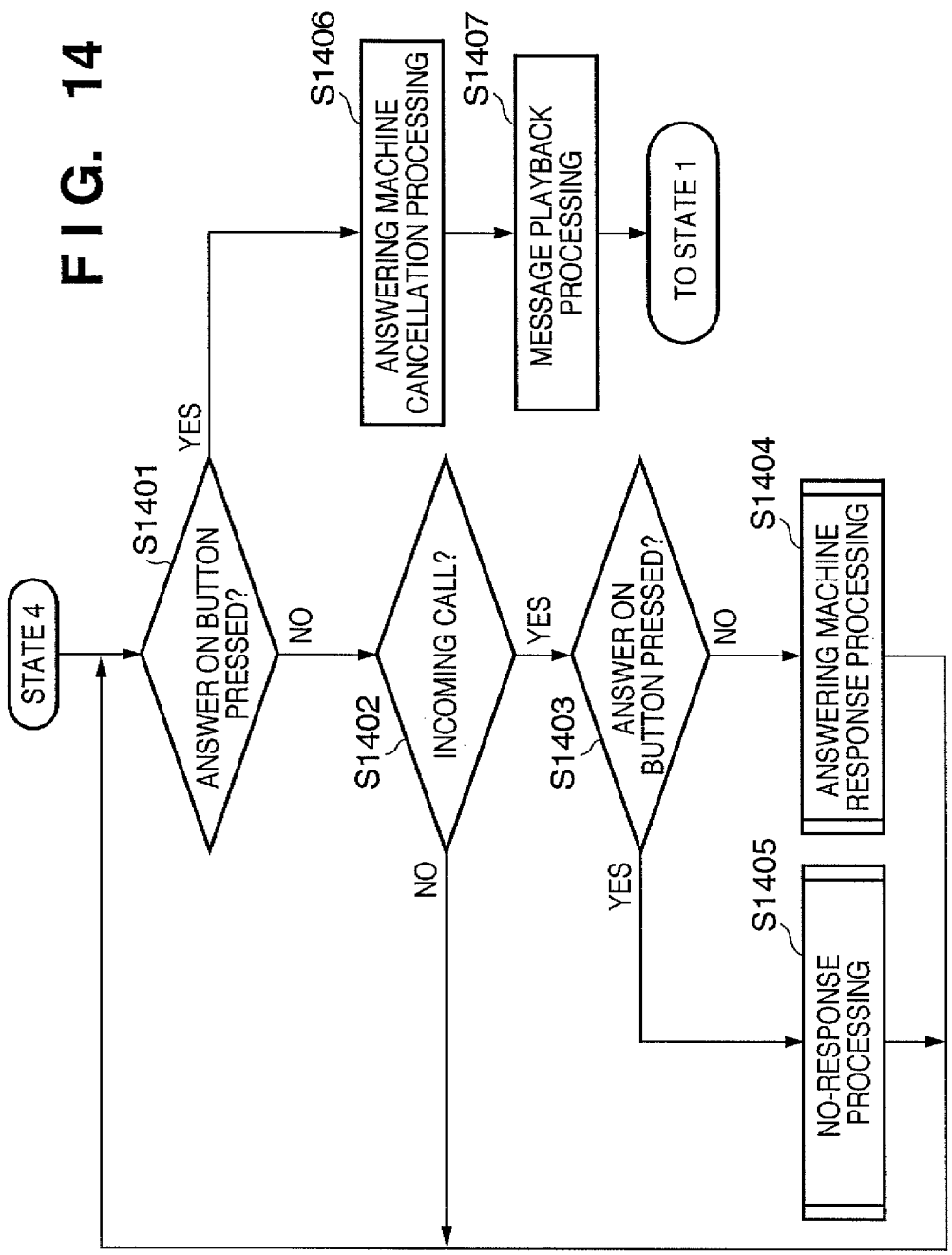
FIG. 14 is a flowchart showing a processing procedure in a state 4 of the second embodiment.

FIG. 14 is a flowchart showing a processing procedure in state 4 of the second embodiment. Firstly, in step S1401, it is determined whether the Answer On button 105 of the base unit 100 or the Answer On button 115 of the cordless handsets 110 to 130 has been pressed. Here, if none of the Answer On buttons have been pressed, the processing proceeds to step S1402 and it is determined whether there is an incoming call. Here, the processing is returned to step S1401 if there is not an incoming call, and proceeds to step S1403 if there is an incoming call. In step S1403, it is determined whether the Answer On button 105 of the base unit 100 or the Answer On button 115 of the cordless handsets 110 to 130 is pressed, in the period until the preset automatic response is performed with respect to the incoming call. Here, if none of the Answer On buttons are pressed, the processing proceeds to step S1404, the answering machine response processing shown in FIG. 9 is executed, and the processing is returned to step S1401. If one of the Answer On buttons has been pressed, the processing proceeds to step S1405, no-response processing, which will be described in detail using FIG. 15 is executed, and the processing is returned to step S1401.

On the other hand, if at the above step S1401 one of the Answer On buttons has been pressed, the processing proceeds to step S1406. Since the answering machine function is set, in step S1406, the answering machine function is cancelled. Then, in step S1407, message playback processing is performed for playing a message recorded in the answering machine response processing, and the answering machine function is transferred to state 1.

Here, the no-response processing executed in the above states 3 and 4 will be described in detail using FIG. 15.

FIG. 15 is a flowchart showing no-response processing in the second embodiment. Firstly, in step S1501, operations are performed with the answering machine function cancelled for the current incoming call only, without changing the state of the answering machine function. This enables the answering machine response to be cancelled while remaining in state 3 or 4, only in the case where an Answer On button is pressed during an incoming call. Next, in step S1502 the line is not held, and in step S1503 the incoming call is allowed to ring through. Note that in this state, a cordless handset other than the cordless handset whose Answer On button was pressed may respond to the incoming call.

The second embodiment can also be applied to nuisance call countermeasures such inhibiting the answering machine response processing and not allowing a message to be left in the case of an unknown caller or the like, by combining the number display function or the like.

Also, in step S1503, it is possible to respond from another cordless handset during an incoming call, thereby enabling flexible call response that also includes consideration for the caller.

Further, memory usage can also be suppressed by stopping a message from being recorded.

Note that refusing to accept an answering machine setting from the cordless handset 110 or 120 during an incoming call, such as when not allowing the answering machine function to be cancelled, for example, can be realized by not responding to the Answer On button 115 being pressed in step S102.

Also, an answering machine setting request is sent from the cordless handset 110 in cases such as where the cordless handset does not know the answering machine setting state of the base unit or when a discrepancy in the states occurs, though it is also possible in step S103 to reject the answering machine setting request and not allow the answering machine function to be set. A response in accordance with the respective states can be realized by combining these configurations.

There are analog and digital wireless methods, although a digital method is better suited in order to always keep the states of the base unit and the cordless handset matched. This is better suited to the present invention in order to perform wireless communication and be able to monitor whether the state of both the base unit and the cordless handset can be wirelessly connected, despite traffic between the base unit and the cordless handset being bursty even in a standby state. However, it is still possible to realize the present invention with an analog method.

The analog method is disadvantageous in terms of matching the states of the base unit and the cordless handset since the range of radio waves is not known unless a wireless connection is activated from the base unit or the cordless handset.

Note that the present invention may also be applied to a system constituted by a plurality of devices (e.g., host computer, interface device, reader, printer, etc.) or to an apparatus composed of a single device (e.g., copier, fax machine, etc.).

A recording medium on which software program code for realizing the functions of the foregoing embodiments may be supplied to a system or an apparatus, and the program code recorded on the recording medium may be read and executed with a computer (CPU or MPU) of the system or apparatus.

In this case, the actual program code read from the recording medium realizes the functions of the foregoing embodiments, and the recording medium storing the program code constitutes the invention.

Examples of recording media for supplying the program code include flexible disk, hard disk, optical disk, magneto-optical disk, CD-ROM, CD-R, magnetic tape, nonvolatile memory card, and ROM.

The functions of the foregoing embodiments are not only realized by a computer executing read program code, and the following cases are also covered by the invention. That is, the case where an operating system or the like running on a computer performs part or all of the actual processing based on instructions in the program code, with the functions of the foregoing embodiments being realized as a result of this processing.

Further, program code read from a recording medium may be written to a memory provided in a function expansion board inserted into a computer or a function expansion unit connected to a computer. A CPU or the like provided in the function expansion board or the function expansion unit then performs part or all of the actual processing based on instructions in the program code, with the functions of the foregoing embodiments being realized as a result of this processing. This case is also covered by the invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-122798, filed May 7, 2007, which is hereby incorporated by reference herein in its entirety.

What is claimed is:

1. A communication apparatus comprising:
a switching unit configured to switch a state of an answering machine function between an on-state and an off-state;
a detecting unit configured to detect an incoming call;
a first determining unit configured to determine, while the incoming call is detected by the detecting unit, whether the state of the answering machine function is switched from the off-state to the on-state by the switching unit;
a second determining unit configured to determine, while the incoming call is not detected by the detecting unit, whether the state of the answering machine function is switched from the off-state to the on-state by the switching unit; and
a control unit configured to control the communication apparatus such that response processing for the detected incoming call by the answering machine function is operated if the first determining unit determines the state of the answering machine function is switched from the off-state to the on-state by the switching unit, and then the state of the answering machine function is switched to the off-state after communication by the detected incoming call terminates and configured to control the communication apparatus such that the response processing is operated if the second determining unit determines the state of the answering machine function is switched from the off-state to the on-state by the switching unit and then the detecting unit detects the incoming call, and then the on-state of the answering machine function is kept even if a communication by the detected incoming call terminates.

2. The communication apparatus according to claim 1, wherein the communication apparatus is a multifunction peripheral having a printer function, a scanner function, a facsimile function, and an answering machine function.

3. A method of controlling a communication apparatus having an answering machine function and a switching unit configured to switch a state of an answering machine function between an on-state and an off-state, the method comprising:
detecting an incoming call to the communication apparatus;
determining, while the incoming call to the communication apparatus is detected, whether the state of the answering machine function is switched from the off-state to the on-state by the switching unit;
determining, while the incoming call to the communication apparatus is not detected, whether the state of the answering machine is switched from the off-state to the on-state by the switching unit; and
controlling the communication apparatus such that response processing for the detected incoming call by the answering machine function is operated if the state of the answering machine function is switched from the off-state to the on-state by the switching unit while the incoming call is detected, and then the state of the answering machine function is switched to the off-state after communication by the detected incoming call terminates, and controlling the communication apparatus such that the response processing is operated if the state of the answering machine function is switched from the off-state to the on-state while the incoming call is not detected and then the incoming call is detected, and then the on-state of the answering machine function is kept even if a communication by the detected incoming call terminates.

4. A non-transitory computer-readable storage medium storing a program for executing a method of controlling a communication apparatus having an answering machine function and a switching unit configured to switch a state of an answering machine function between an on-state and an off-state, the method comprising:
 detecting an incoming call to the communication apparatus;
 determining, while the incoming call to the communication apparatus is detected, whether the state of the answering machine function is switched from the off-state to the on-state by the switching unit;
 determining, while the incoming call to the communication apparatus is not detected, whether the state of the answering machine function is switched from the off-state to the on-state by the switching unit; and
 controlling the communication apparatus such that response processing for the detected incoming call by the answering machine function is operated if the state of the answering machine function is switched from the off-state to the on-state by the switching unit while the incoming call is detected, and then the state of the answering machine function is switched to the off-state after communication by the detected incoming call terminates, and controlling the communication apparatus such that the response processing is operated if the state of the answering machine function is switched from the off-state to the on-state while the incoming call is not detected and then the incoming call is detected, and then the on-state of the answering machine function is kept even if a communication by the detected incoming call terminates.

5. The communication apparatus according to claim 1, further comprising a wireless communication unit configured to perform a wireless communication with a wireless communication terminal, wherein the wireless communication unit notifies the wireless communication terminal if the detecting unit detects the incoming call.

6. The communication apparatus according to claim 5, wherein the switching unit switches the state of the answering machine function in response to a request from the wireless communication terminal.

\* \* \* \* \*